United States Patent Office 2,775,596
Patented Dec. 25, 1956

2,775,596

PRODUCTION OF SUBSTITUTED PYRIDINES

John E. Mahan, Bartlesville, Okla., assignor to Phillips Petroleum Company, a corporation of Delaware No Drawing. Application October 20, 1952,
Serial No. 315,837

15 Claims. (Cl. 260—290)

This invention relates to a process for the production of substituted pyridines. In one aspect this invention relates to a process for the production of alkyl substituted pyridines by the catalytic condensation of aldehydes and ketones with ammonia. In one specific embodiment this invention relates to a novel process for the production of 2-methyl-5-ethylpyridine.

Pyridine homologs are useful as intermediate compounds in the production of pyridine derivatives containing unsaturated side chains, such as the vinyl pyridines which are capable of undergoing copolymerization with other unsaturated organic compounds, such as butadiene, to produce potentially useful synthetic rubbers. Vinyl pyridines can be prepared from pyridine homologs, such as 2-methyl-5-ethylpyridine which is also known as aldehyde collidine and aldehydin, by various methods. For example, 2-methyl-5-ethylpyridine may be reacted with formaldehyde to produce the monomethylol derivative which, upon dehydration, produces 2-vinyl-5-ethylpyridine. Also, the ethyl group in 2-methyl-5-ethylpyridine may be dehydrogenated to produce 2-methyl-5-vinylpyridine.

The condensation of aldehydes and ketones, either saturated or unsaturated, and derivatives thereof with ammonia or its derivatives to form substituted pyridines is one of the oldest of organic reactions. See R. L. Frank et al., Journal of the American Chemical Society, 71, pages 2629 et seq. (August, 1949) and R. L. Frank et al., Journal of the American Chemical Society, 68, pages 1368-9 (July, 1946). The condensation reactions have been effected non-catalytically, and ammonium acetate and alumina have been employed in the prior art as catalysts for the reaction. Also, ammonium chloride has been reported as showing the same effect as ammonium acetate. However, the prior art methods have a poor reputation for commercial production because of the formation of mixtures of pyridines and various by-products. In addition, when operating according to the prior art, relatively low yields of individual products have usually been reported.

This is a continuation-in-part of my application, Serial No. 135,291, filed December 27, 1949 (now U. S. Patent No. 2,615,022), entitled "Production of Substituted Pyridines."

It is an object of this invention to provide a novel process for the production of substituted pyridines.

It is another object of this invention to provide a process for the production of substituted pyridines that eliminates difficulties in the proir art processes.

It is another object of this invention to condense aldehydes and ketones and their derivatives with ammonia in the presence of novel catalysts for the reaction.

It is another object of this invention to provide a novel process for the production of 2-methyl-5-ethylpyridine from low-boiling aldehydes and ammonia.

It is a further object of this invention to employ novel catalysts for the condensation of low-boiling aldehydes and ammonia to produce 2-methyl-5-ethylpyridine.

Further and additional objects of my invention will be apparent from the disclosure and description hereinbelow.

I have found that substituted pyridines can be produced by the improved method of reacting an organic aldehyde or ketone or derivative thereof with ammonia in the presence of fluorine-containing catalysts.

According to my invention, ammonia and an organic aldehyde, ketone or derivative thereof that is known to condense with ammonia to form substituted pyridines are reacted in the presence of a fluorine-containing catalyst. Throughout this disclosure I will refer to the aldehydes, ketones and derivatives thereof as carbonyl compounds. The carbonyl compounds within the scope of my invention are known in the art, and illustrative examples of these compounds are set forth in detail in the above-named references. To produce 2-methyl-5-ethylpyridine I prefer to use an aldehyde containing no more than six carbon atoms per molecule, such as acetaldehyde, crotonaldehyde, and paraldehyde. However, my invention is not limited in scope to the production of this particular pyridine derivative nor to the use of the specific aldehydes named above. For example, aldehydes and ketones, i. e., crotonaldehyde, benzalacetophenone, benzaldiacetophenone, ethylidene acetone, p-chlorobenzaldiacetophenone, anisaldiacetophenone, alpha-acetylbutyrolactone, cyclopentanone, tetrahydropyrone and beta-cyclohexyl-propionaldehyde, may be condensed with ammonia to form pyridine derivatives. In addition, mixtures of aldehydes and ketones, for example, benzaldehyde and acetophenone, benzalidacetophenone and acetophenone, benzaldehyde and desoxybenzoin, benzalacetone and acetophenone, and benzalacetone and acetone, may be employed to form pyridine derivatives. Frequently and advantageously, the aldehydes can be employed as polymers, e. g., acetaldehyde can be employed as paraldehyde. However, aliphatic aldehydes and ketones having a carbonyl group attached to a carbon atom with two hydrogen atoms attached thereto are preferred.

I have found that the condensation of aldehydes and ketones with ammonia can be very advantageously catalyzed by selected metal fluorides and bifluorides, i. e., compounds where the metal fluoride is associated with one or more molecules of hydrogen fluoride. The metal in the fluoride or bifluoride compound can be any metal in group Ib and groups II to VIII, inclusive, of the periodic table. Metals of group Ia appear to be of somewhat unpredictable character, some of them actually having a deleterious effect upon the condsenation reaction, rather than promoting it. Accordingly, metals of group Ia are not included in the generic concept of this invention. A considerable difference of opinion exists as to whether some elements of groups III to VIII of the periodic table should be considered metals or non-metals. In accordance with this invention, these elements, namely, tellurium, arsenic, silicon, boron, and selenium, are classified as non-metals, and are thus excluded from the concept of this invention. Of course, elements such as sulfur, phosphorus, chlorine and the like, are excluded as no controversy exists as to whether these elements are metallic or non-metallic.

The preferred metal fluoride catalysts of this invention are antimony fluoride, copper fluoride, bismuth fluoride, zinc fluoride, iron fluoride, and barium fluoride. This group of metal fluorides exhibits outstanding catalytic properties, as will be apparent from the examples to be hereinafter described, and these compounds have been found to be particularly suitable as catalysts in the condensation of aldehydes and ketones with ammonia to form pyridines or substituted pyridines. Of the other metal fluorides, silver, aluminum, and titanium fluorides are preferred.

Certain fluorides of the elements of group Ia particularly potassium and sodium actually inhibit the catalytic reaction, rather than promoting it. That is, the conversion to desired substituted pyridine products is less when these compounds are present than when no catalyst at all is used.

In the appended claims, metal fluoride compounds shall be considered to include both the metal fluorides themselves or the metal fluorides associated with one or more molecules of hydrogen fluoride, that is the bifluorides.

I have found it preferable to employ the catalysts in relatively small amounts. Usually from 0.2 to 10.0, preferably 1.5 to 5.0, weight percent of catalyst based on the carbonyl compound is employed.

Mol ratios of ammonia to carbonyl compound undergoing condensation within the range of 1:1 to 12:1 are utilized, but higher ratios are operable in my process. I prefer to use mol ratios of ammonia to carbonyl compound within the range of 2:1 to 9:1 in order to maintain the volume of material to be handled at a low level.

The ammonia for the reaction is usually in an aqueous solution, but in some instances it may be desirable to conduct the reaction with anhydrous liquid ammonia. When an aqueous ammonia solution is utilized for the reaction, ammonia and water are supplied to the reaction in a ratio such that a solution containing 10 to 90 weight percent ammonia is formed.

Optimum reaction temperatures are within the range of 300 to 600° F., preferably 450 to 550° F. The reaction is usually effected in the liquid phase, and, consequently, pressures at least sufficient to maintain the reaction mixture in liquid phase are employed. When operating with a closed pressure reactor, the autogenous pressures developed by the reaction mixture at the reaction temperature are satisfactory. These pressures are usually within the range of 850 to 2500 pounds per square inch gauge. The reaction period, or the time during which the reaction mixture is maintained at the desired reaction temperature, may vary from 5.0 minutes to 5.0 hours, preferably no longer than 2.0 hours. However, good yields of substituted pyridines can be obtained by cooling the reaction mixture, such as by quenching in ice water, as soon as the desired reaction temperature is attained. I have also found it desirable to cool the reaction mixture rapidly such as by quenching in ice water, after the desired reaction period has expired. In this manner improved yields are obtained over procedures wherein the reaction mixture is allowed to cool slowly after expiration of the reaction period. Reaction periods longer than 2.0 hours may be used, but they are not essential to the process. Little, if any, advantage is gained by so operating, and, actually, the longer reaction periods may be conducive toward decomposition of the reaction products, resulting in decreased yields of the desired substituted pyridines. At the end of the desired reaction period, the temperature is lowered to about room temperature, and the substituted pyridines are recovered from the reaction mixture by any suitable method, such as fractional distillation.

In some instances it may be found desirable to employ an emulsifying agent in the reaction mixture. It is preferred that any emulsifying agent so employed be soluble in at least one of the components of the reaction mixture. Emulsifying agents that may be used include salts of saturated or unsaturated fatty acids containing at least six and not more than 18 carbon atoms, sulfates, such as lauryl sulfate, and sulfonates such as alkaryl sulfonates. Non-ionic detergents, such as ethylene oxide condensation products of organic acids, alcohols, mercaptans, phenols, amides, and the like, as well as cationic surface active agents of the quaternary ammonium ion type may also be used. The emulsifying agent is usually present in the range of 0.1 to 5.0 percent by weight, based on the carbonyl compound.

Although I have described my invention as a batch process, the invention may also be practiced in a continuous operation, and such operation is within the scope of my invention. In one embodiment of a continuous process, reactants are introduced continuously to a suitable pressure reactor from which a portion of the reaction mixture is withdrawn continuously. Reaction products are separated therefrom, and unchanged reactants are then recycled to the reactor.

In another aspect of the invention, phosphate glasses are utilized as synergists for the condensation reactions catalyzed by the novel fluorine-containing catalyst hereinbefore set forth. Calcium phosphate glasses can be used, but I usually employ water soluble alkali metal phosphate glasses, and I prefer to use a water soluble sodium phosphate glass. Descriptions of these glasses and the methods of producing them are contained in the articles by Partridge, Chemical and Engineering News, 27, 214–217 (1949) and by Schwartz et al., Industrial and Engineering Chemistry, 34, 32–40 (1942). The metal phosphate glasses, and particularly the sodium phosphate glasses, are readily prepared by heating the corresponding metal metaphosphate to a temperature above its melting point and rapidly cooling the resulting liquid to form a vitreous or glassy product. The glasses contain $P_2O_5$ and metallic oxides in varying amounts, and the ratio of $P_2O_5$ and metallic oxides extends over a wide range. More specifically, the glasses I employ can contain a minor, say 0.1 mol percent, amount of metallic oxide, and the concentration of the metallic oxide may vary up to 60 mol percent. The preferred glass is available commercially, and it is known as sodium hexametaphosphate. This preferred glass contains approximately equimolar proportions of $Na_2O$ and $P_2O_5$.

The water soluble metal phosphate glasses are introduced to the reaction mixture either in the form of a solid or in an aqueous solution, and, when I refer to phosphate glasses in my specification and claims, it will be understood that I am referring to phosphate glasses in the form of a solid or an aqueous solution. Since water is formed during the condensation reaction, it is sometimes desirable to introduce the glasses in solid form in order to limit the amount of water present in the reaction mixture. In operations where it is necessary to employ a large amount of the glasses in the reaction it may be desirable to introduce the glasses in an aqueous solution to facilitate the handling and transporting of the glasses. Usually, from 0.05 to 10, preferably, 0.1 to 6 weight percent of the glasses based on the carbonyl compound is employed. The total amount of fluorine-containing catalyst and metal phosphate glass synergist is usually not above 10 weight percent based on the carbonyl compound.

The examples hereinbelow are illustrative of my invention. In these experiments a stainless steel bomb of 1400 milliliter capacity was employed. The bomb was provided with a thermometer well together with an inlet line containing a valve, and the bomb was wrapped with resistance wire and thus heated electrically. In conducting the experiment the bomb was charged with reactants, such as paraldehyde, aqueous or liquid ammonia and catalyst (when used) and firmly sealed. Air was removed from the bomb by adding nitrogen to a pressure of one hundred pounds per square inch and venting until the pressure was again atmospheric. A period of one hour to one and one-half hours was required for the bomb to attain the desired reaction temperature, and the duration of the run was the interval of time that the bomb was held at the desired reaction temperature. Agitation of the bomb was provided by an electrically driven platform rocker. At the end of the reaction period, the reaction mixture, after venting excess ammonia, was extracted with benzene and the extract was fractionated to recover the pyridine derivatives.

*Example*

A series of runs was made to demonstrate the superior yields obtained when using the catalytic materials of my invention. One run was made non-catalytically to serve as a control. All runs were made under substantially identical conditions of temperature, pressure, mol ratios of reactants, and the like, as follows:

| | | |
|---|---|---|
| Temperature | °F | 490–500 |
| Reaction time | hours | 3 |
| Ammonia/paraldehyde, mol ratio | | 7.91 |
| Charge: | | |
| Paraldehyde | grams | 170 |
| Water | do | 211 |
| Ammonia | do | 173 |

The following results were obtained:

| Catalyst | Yields, Mol Percent | | Mols of Catalyst Used |
|---|---|---|---|
| | Picolines | 2-methyl-5-ethyl-pyridine | |
| Antimony Fluoride | 1.5 | 76.8 | .18 |
| Copper fluoride (cupric) | 2.8 | 71.8 | .18 |
| Bismuth fluoride | 1.8 | 71.0 | .18 |
| Zinc Fluoride | 1.8 | 69.8 | .18 |
| Iron fluoride (ferric) | 2.3 | 69.8 | .04 |
| Barium fluoride | 2.6 | 69.5 | .18 |
| Silver fluoride | 2.8 | 61.9 | .18 |
| Aluminum fluoride | 3.5 | 61.8 | .18 |
| Titanium fluoride | 1.7 | 60.8 | .18 |
| None | 2.6 | 56.3 | |

From the foregoing example, it will be noted that the preferred group of antimony fluoride, copper fluoride, bismuth fluoride, zinc fluoride, iron fluoride and barium fluoride provided conversions to methylethylpyridine of at least 13.2 percent greater than the control run where no catalyst was used. Further, it is shown that other preferred fluorides give higher conversions than the control run, thus showing the generality of the catalytic action of the metal fluoride compounds.

While the invention has been described in connection with a present, preferred embodiment thereof, it is to be understood that this description is illustrative only and is not intended to limit the invention.

I claim:

1. In a process for producing pyridine derivatives by the interaction of carbonyl compound with ammonia, the improvement which comprises effecting the reaction in the presence of a compound selected from the group consisting of antimony fluoride, copper fluoride, bismuth fluoride, zinc fluoride, iron fluoride, and barium fluoride.

2. A process in accordance with claim 1 in which the metal fluoride compound is antimony fluoride.

3. A process in accordance with claim 1 in which the metal fluoride compound is copper fluoride.

4. A process in accordance with claim 1 in which the metal fluoride compound is bismuth fluoride.

5. A process in accordance with claim 1 in which the metal fluoride compound is zinc fluoride.

6. A process in accordance with claim 1 in which the metal fluoride compound is iron fluoride.

7. A process in accordance with claim 1 in which the metal fluoride compound is barium fluoride.

8. A process for preparing 2-methyl-5-ethylpyridine which comprises reacting paraldehyde with ammonia in the presence of a compound selected from the group consisting of antimony fluoride, copper fluoride, bismuth fluoride, zinc fluoride, iron fluoride, and barium fluoride.

9. A process in accordance with claim 1 conducted in the presence of a water soluble phosphate glass as a synergist.

10. The process for preparing pyridine derivatives which comprises reacting an aliphatic aldehyde containing 1 to 6 carbon atoms with ammonia in the presence of a compound selected from the group consisting of antimony fluoride, copper fluoride, bismuth fluoride, zinc fluoride, iron fluoride, and barium fluoride.

11. The process for preparing pyridine derivatives which comprises reacting a carbonyl compound containing 3 to 6 carbon atoms selected from the group consisting of aliphatic aldehydes and aliphatic ketones having a carbonyl group attached to a carbon with two hydrogen atoms attached thereto with ammonia in the presence of a compound selected from the group consisting of antimony fluoride, copper fluoride, bismuth fluoride, zinc fluoride, iron fluoride, and barium fluoride.

12. The process for preparing 2-methyl-5-ethylpyridine which comprises reacting a carbonyl compound of 3 to 6 carbon atoms selected from the group consisting of aliphatic aldehydes and aliphatic ketones wherein the carbonyl group is attached to a carbon atom having two hydrogens attached thereto with 1 to 12 mols of ammonia per mol of carbonyl compound at a temperature in the range of 300 to 650° F. and at a pressure in the range of 850 to 2500 pounds per square inch gauge said reaction being in the presence of a compound selected from the group consisting of antimony fluoride, copper fluoride, bismuth fluoride, zinc fluoride, iron fluoride, and barium fluoride.

13. The process according to claim 12 wherein the ammonia is in an aqueous solution of 10 to 90 weight percent ammonia.

14. The process according to claim 13 wherein the ammonia is in the range of 2 to 9 mols per mol of carbonyl compound and the temperature is in the range of 450 to 550° F. and the reactants are quenched after two hours reaction time.

15. The process according to claim 14 wherein the 2-methyl-5-ethyl pyridine is recovered from the reaction products by fractional distillation.

References Cited in the file of this patent

UNITED STATES PATENTS

| 2,184,235 | Groll et al. | Dec. 19, 1939 |
| 2,413,598 | Ballard et al. | Dec. 31, 1946 |
| 2,520,097 | Hearne et al. | Aug. 22, 1950 |
| 2,615,022 | Mahan | Oct. 21, 1952 |
| 2,703,804 | Mahan | Mar. 8, 1955 |
| 2,706,730 | Mahan | Apr. 19, 1955 |

OTHER REFERENCES

Moeller: Inorganic Chemistry, John Wiley and Sons, 1952.